(12) United States Patent
Perner et al.

(10) Patent No.: US 6,270,729 B1
(45) Date of Patent: Aug. 7, 2001

(54) APPARATUS AND PROCESS FOR THE INTENSIVE DEGASSING OF PVC SUSPENSIONS AND DISPERSIONS

(75) Inventors: Thomas Perner, Essingen; Gunter Elzer, Mannheim, both of (DE)

(73) Assignee: Solvin (Societe Anonyme), Brussels (BE)

( * ) Notice: Subject to any disclaimer, the term of this patent is extended or adjusted under 35 U.S.C. 154(b) by 837 days.

(21) Appl. No.: 08/518,719

(22) Filed: Aug. 24, 1995

(51) Int. Cl.[7] .................................................. B32B 27/04
(52) U.S. Cl. ......................... 422/131; 526/344; 528/500; 95/264; 96/201
(58) Field of Search ........................... 422/131; 526/344; 528/500; 95/264; 96/201

(56) References Cited

U.S. PATENT DOCUMENTS

| | | | |
|---|---|---|---|
| 4,077,135 | * 3/1978 | Tzschoppe et al. | 528/500 |
| 4,130,527 | * 12/1978 | Miller et al. | 528/500 |
| 4,158,092 | * 6/1979 | Botsch et al. | 528/501 |
| 4,171,427 | * 10/1979 | Ohorodnik et al. | 528/500 |
| 4,197,399 | * 4/1980 | Noel et al. | 528/500 |

FOREIGN PATENT DOCUMENTS

| | | |
|---|---|---|
| 1 248 943 | 8/1967 | (DE) . |
| 25 31 111 | 2/1976 | (DE) . |

\* cited by examiner

*Primary Examiner*—David W. Wu
*Assistant Examiner*—William K. Cheung
(74) *Attorney, Agent, or Firm*—Keil & Weinkauf

(57) ABSTRACT

An apparatus for the intensive degassing of polyvinyl chloride-containing dispersions comprising a polymerization reactor (1), a cooling device (2), and a vacuum unit (3), where the polymerization reactor (1) contains a steam inlet (4) in the lower half, and the polymerization reactor (1), the cooling device (2) and the vacuum unit (3) are connected to one another via a connector (5). The invention also relates to the use of this apparatus and to a process for intensive degassing using this apparatus.

3 Claims, 1 Drawing Sheet

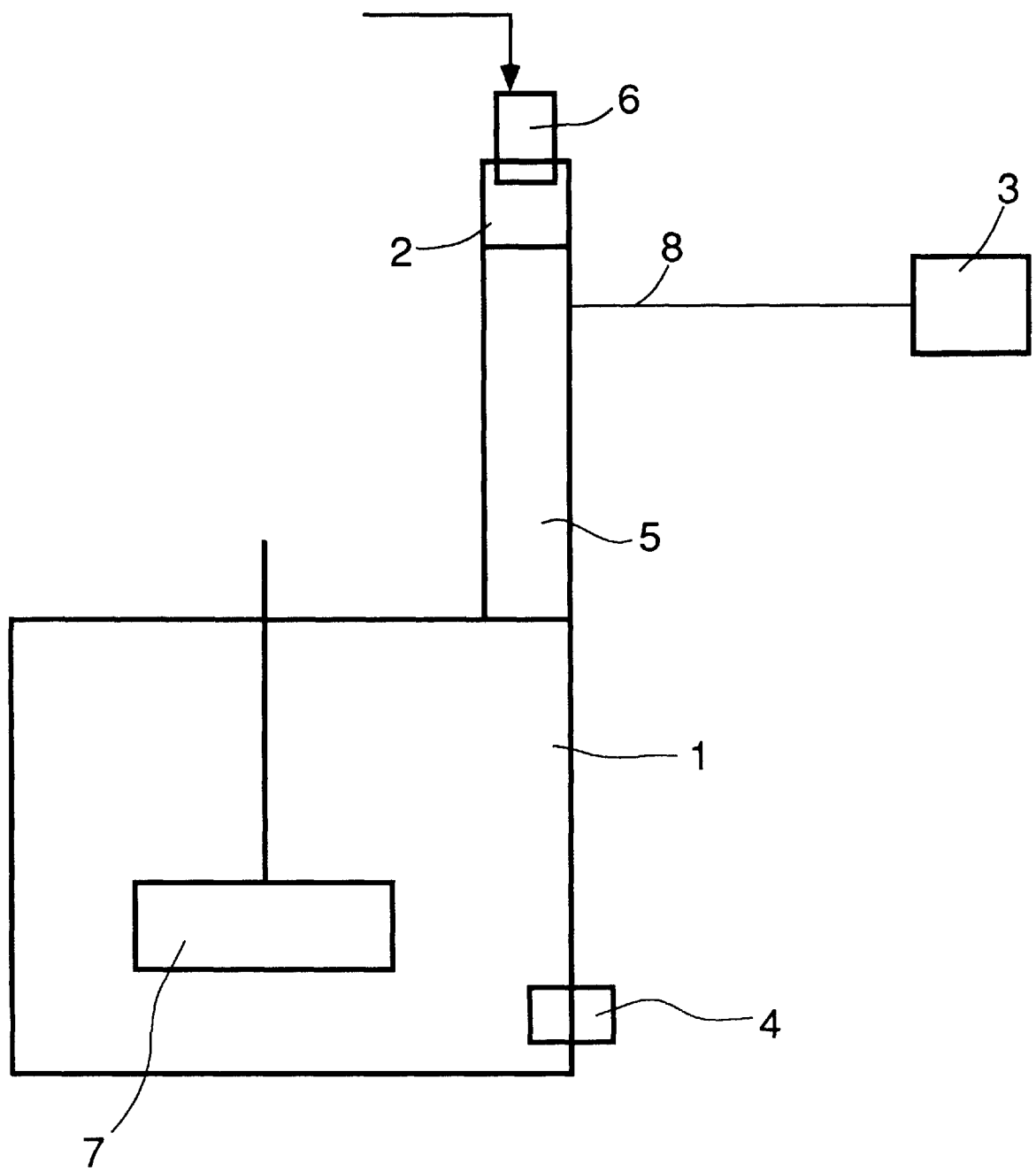

APPARATUS AND PROCESS FOR THE INTENSIVE DEGASSING OF PVC SUSPENSIONS AND DISPERSIONS

BACKGROUND OF THE INVENTION

1. Field of the Invention

The present invention relates to an apparatus for the intensive degassing of polyvinyl chloride-containing dispersions, essentially comprising a polymerization reactor (1), a cooling device (2), and a vacuum unit (3), where the polymerization reactor (1) contains a steam inlet (4) in the lower half, and the polymerization reactor (1), the cooling device (2) and the vacuum unit (3) are connected to one another via a connector (5).

The present invention furthermore relates to the use of the novel apparatus for the intensive degassing of PVC dispersions, and to a process for this purpose.

2. Description of the Prior Art

DE-A 25 31 111 describes a process for the removal of residual vinyl chloride (VC) from vinyl chloride polymer in aqueous dispersion (both suspension and emulsion), where the aqueous dispersion of the polymer is brought to a temperature at least the same as the freezing range of the polymer and is subjected to entrainment by an inert fluid. In particular, DE-A 25 31 111 uses steam as the inert fluid, which, after leaving the aqueous dispersion, is condensed in a condenser, on which a vacuum pump is arranged directly. The disadvantage of this process are the residual VC values in the degassed suspensions (in contrast to emulsions, which naturally can be degassed more easily owing to their particle size). According to the table in DE-A 25 31 111, the residual VC contents before drying are not less than 25 ppm. The value given for Example 5 corresponds to the residual VC content after drying, since the same conditions as in Example 1 were observed apart from a shorter (!) degassing time.

EP-A 359 432 describes an apparatus for degassing liquid mixtures essentially comprising polystyrene and volatile constituents such as monomers, in which a heat exchanger and a vacuum unit are connected directly to the vessel containing the polymer mixture to be degassed. The residual monomer contents achieved are less than 300 ppm, but are not below 177 ppm.

SUMMARY OF THE INVENTION

It is an object of the present invention to provide an improved apparatus for the intensive degassing of PVC-containing dispersions, in particular suspensions and emulsions, in the polymerization reactor which allows residual VC values of less than 25 ppm, in particular less than 10 ppm, to be obtained before drying of dispersions, in particular of suspensions, thus avoiding further, subsequent treatment for removal of residual VC without impairing the product quality. Furthermore, the removal of residual VC should be achieved using as little steam as possible.

We have found that this object is achieved by an apparatus for the intensive degassing of polyvinyl chloride-containing dispersions, essentially comprising a polymerization reactor (1), a cooling device (2), and a vacuum unit (3), where the polymerization reactor (1) contains a steam inlet (4) in the lower half, and the polymerization reactor (1), the cooling device (2) and the vacuum unit (3) are connected to one another via a connector (5).

The invention furthermore provides the use of the novel apparatus and a process for the intensive degassing of PVC-containing dispersions.

DESCRIPTION OF THE PREFERRED EMBODIMENTS

Polymerization reactors (1) which can be employed according to experience hitherto are all reactors which are suitable for polymerization of vinyl chloride. The invention provides that a steam inlet is provided in the lower half of the polymerization reactor. In general, the inlet used is a commercially available inlet, usually installed in a manner known per se. The steam is preferably introduced in such a way that it is homogeneously distributed in the polymerization reactor (1) and in the dispersion. The distribution of the steam can, if necessary, be supported by stirring.

The cooling device (2) employed can be a commercially available reflux condenser, preferably a tube-bundle condenser, in which the cooling surface area can be changed by introducing inert gas. The dimensions of the cooling surface of the cooling device depend essentially on the residual VC content, the amount of steam introduced and the amount of dispersion. The cooling surface of the cooling device is expediently designed in such a way that some of the steam can condense on the cooling surface in order always to keep the dispersion in a predetermined temperature range under reflux conditions.

The vacuum unit (3) employed can be a conventional vacuum pump with compressor, where the performance of the compressor usually depends essentially on the dimensions of the polymerization reactor, the reduced pressure desired and the residual VC content desired. The range of suitable vacuum units is customary to the person skilled in this area, so that further details are superfluous.

According to observations hitherto, the shape of the connector (5) has no effect on the success of the process. However, preference is given to cylindrical shape having a length:diameter ratio in the range from 10:1 to 1:1, preferably from 7:1 to 3:1. Furthermore, the dimensions of the connector (5) are usually selected so that the ratio between the volumes of the polymerization reactor (1) and the connector (5) are in the range from 100:1 to 10:1, preferably from 50:1 to 2:1. The connector can also contain internals, which allow any foam produced in the polymerization reactor to be kept away from the cooling device and the vacuum unit.

BRIEF DESCRIPTION OF THE DRAWING

The drawing schematically sets forth apparatus for degassing polyvinyl chloride suspensions and dispersions. In a preferred embodiment (see attached drawing), the polymerization reactor (1) used is a conventional vessel for this purpose, made, for example, of stainless steel, with a volume in the range from 10 to 250 $m^3$. The polymerization reactor (1) expediently contains, for example for better distribution of the steam during the intensive degassing, a stirring device (7) conventional for polymerizations, as described, for example, in DE-A 33 25 095. A cylindrical connector (5) whose length:diameter ratio is in the range from 10:1 to 1:1, preferably from 7:1 to 3:1, connects the polymerization reactor (1) to the cooling device (2), which comprises a tube-bundle reactor having a cooling surface area in the range from 20 to 200 $m^2$, preferably from 60 to 125 $m^2$.

The cooling device (2) particularly preferably contains inlet for an inert gas (6), so that, in addition to regulation via the amount of steam from the steam inlet (4) and the amount of steam removed via the vacuum unit (3), there is a further possibility of keeping the internal temperature constant by controlling the size of the cooling surface: increased addition of an inert gas, such as nitrogen, argon, helium, in particular nitrogen, results in a reduction in the cooling surface available for condensation of the steam (and thus an increase in the temperature in the polymerization reactor for a constant amount of steam), while reduced addition of an inert gas, or no addition at all, results in an increase in the cooling surface available for condensation of the steam (and thus a reduction in the temperature). The amount of inert gas introduced is expediently selected so that the precise amount of steam necessary for optimum intensive degassing can be added without reducing the internal temperature in the polymerization reactor. In general, this is achieved by coupling the inert-gas supply to the valve setting of the steam inlet (4). This allows optimum utilization, ie. minimum supply of steam, to be achieved.

In the preferred embodiment described above, the outlet line (8) to the vacuum unit (3) is usually in the upper half, preferably in the upper third, of the connector (5). The capacity of the compressor for the vacuum pump in the preferred embodiment described above is chosen in the range from 500 to 2000 m$^3$/h, preferably from 800 to 1200 m$^3$/h, so that a reduced pressure in the range from 20 to 90 kPa, preferably from 40 to 85 kPa, can be achieved in the polymerization reactor.

It may furthermore be expedient to provide a device for precipitating any entrained foam ("foam tower") and, if desired, a further cooling unit for recovering the water employed in the foam tower between the connector (5) and the vacuum unit (3).

The novel process is used for dispersions, in particular suspensions, preferably prepared in the polymerization reactor (1). It is of course also possible to degas dispersions prepared in another reactor and pumped into the polymerization reactor (1). However, it is a particular advantage of the novel process that both polymerization and degassing can be carried out in the polymerization reactor (1) without additional measures, such as pumping of the dispersions or aftertreatment of the degassed material.

The polymerization to give PVC-containing dispersions, in particular suspensions, is carried out in a manner known per se, preferably by suspension polymerization, it also being possible to carry out the polymerization of the vinyl chloride in the presence of emulsion polymers, such as acrylate-based polymers prepared in one or more steps (see, for example, DE-A 21 62 615, DE-B 20 13 020, DE-A 2 222 867, EP-A 222 127 and EP-B 496 121).

The monomers are, in particular, vinyl chloride or mixtures of vinyl chloride and other monomers (comonomers) containing at least 80% by weight of vinyl chloride. Particularly suitable comonomers of vinyl chloride are vinyl esters, for example vinyl acetate, vinyl propionate, inter alia, vinyl ethers, such as vinyl methyl ether, vinyl ethyl ether, vinyl isobutyl ether, inter alia, $C_1$–$C_8$-alkyl esters of acrylic acid, such as butyl acrylate and 2-ethylhexyl acrylate, and dialkyl maleates, such as dibutyl maleate.

In the case of suspension polymerization, the protective colloids usual in the polymerization of polyvinyl chloride can be employed, such as partially hydrolyzed polyvinyl alcohols or cellulose ethers, such as methyl-, methylhydroxyethyl- and methylhydroxypropylcellulose. Polyvinyl alcohols and cellulose ethers can also be employed in combination.

Suitable monomer-soluble initiators in the suspension polymerization are conventional peroxides, peresters, percarbonates and azo compounds, for example dilauroyl peroxide, dibenzoyl peroxide, tert-butyl perneodecanoate, tert-butyl perpivalate, tert-butyl-2-ethylhexanoate, trimethylpentyl perneodecanoate, diisopropyl peroxydicarbonate, di-n-butyl peroxydicarbonate, di-2-ethylhexyl peroxydicarbonate and dicyclohexyl peroxydicarbonate.

The pH can be adjusted before, during or after the suspension polymerization by addition of buffer salts, such as sodium phosphate, sodium polyphosphate or sodium hydrogencarbonate.

The polymerization temperature depends on the desired molecular weight or K value of the product and is preferably from 35 to 80° C., particularly preferably from 45 to 70° C. The polymerization is expediently not continued until all the vinyl chloride has been converted, but instead is terminated at a conversion of from 60 to 95%, preferably from 70 to 85%.

According to observations hitherto, the dispersion to be degassed can, without disadvantages, contain the auxiliaries usually present during the polymerization, such as residues of the initiator and dispersants.

The concentration of solids in the dispersion to be degassed can, if desired, be modified by diluting or concentrating the dispersion, or the physical state of the solids can be modified, for example by coagulating the dispersion.

The mean particle diameter ($d_{50}$ value) is generally in the range from 50 to 250 μm, preferably from 100 to 200 μm.

The dispersion obtained after the polymerization can be subjected directly to the intensive degassing by reducing the pressure to the range from 20 to 90 kPa and adjusting the temperature to the range from 80 to 100° C. However, the intensive degassing is preferably preceded by pre-degassing by decompressing the pressurized polymerization reactor to atmospheric pressure and selecting the temperature in the range from 80 to 100° C. The dispersion pre-degassed in this way usually contains vinyl chloride in the range from 200 to 5000 ppm, preferably from 800 to 2000 ppm.

The intensive degassing is generally carried out at from 80 to 100° C., preferably at from 85 to 95° C. The pressure in the polymerization reactor is generally chosen in the range from 20 to 90 kPa, preferably from 40 to 85 kPa.

During the intensive degassing, steam is introduced into the polymerization reactor via a steam inlet, the steam pressure generally being selected in the range from 0.5 to 4.0 mPa, preferably from 1.4 to 1.8 mPa. The temperature of the steam is usually in the range from 100 to 250° C., preferably from 180 to 220° C.

The amount of steam introduced depends essentially on the selected internal temperature in the polymerization reactor and preferably also on the amount of inert gas introduced and on the amount of dispersion. In general, from 0.03 to 0.2 t/h, preferably from 0.07 to 0.17 t/h, of steam are introduced into the polymerization reactor per tonne of PVC (based on dried PVC). At the same time, at least 0.01 t/h, preferably more than 0.02 t/h, of steam are introduced per tonne of PVC (dried).

The amount of inert gas fed into the cooling device to keep the internal temperature in the polymerization reactor constant depends essentially on the desired internal temperature, the amount of steam introduced and the amount of dispersion. The amount of inert gas is usually selected in the range from 0.1 to 5 m$^3$, preferably from 0.5 to 2 m$^3$, per tonne of PVC (dried).

The duration of the intensive degassing is usually effected in the range from 0.5 to 2 h, preferably from 45 to 90 min.

The novel apparatus is used in accordance with the invention for the intensive degassing of PVC dispersions, in particular for PVC suspensions in which residual VC contents of less than 25 ppm, preferably less than 10 ppm, particularly preferably less than or equal to 2 ppm, are to be achieved. The subsequent drying and further processing are carried out in a manner known per se in decanters, pneumatic driers or in a fluidized bed, it being possible, if desired, to remove undesired coarse particles, if present, by screening (see Becker/Braun, Kunststoff-Handbuch 2/1, p. 218 ff, 1986).

The advantage of the novel apparatus consists in that the residual VC contents of PVC dispersions, in particular of PVC suspensions, can be reduced to values below 10 ppm before drying with-out conventional aftertreatment steps in order to reduce the residual VC contents. Furthermore, the amount of steam can be minimized by coupling steam feed and inert-gas feed.

EXAMPLES

The particle size was determined using a MALVERN Mastersizer (see also Verfahrenstechnik 24 (1990), p. 36 ff). The Fraunhofer diffraction was measured at a wavelength of 633 nm. By choosing a supplementary lens having a focal length of f=600 mm, the particle size distribution was determined in the range from 10 to 600 μm. The mean particle diameter, also known as $d_{50}$ value of the cumulative weight distribution, is defined as the particle diameter at which 50% of the particles have a smaller diameter than the diameter corresponding to the $d_{50}$ value. 50% by weight of the particles then also have a larger diameter than the $d_{50}$ value.

The measurements of the VC contents were carried out by gas chromatography, in each case about 1 g of suspension being weighed out, then conditioned for 15 minutes at 80° C. and analyzed by the head-space method (Zeit. fur analyt. Chemie 255 (1971), pp. 345 to 350).

The Fikentscher K value (Cellulosechemie, Vol. 13 (1932), pp. 48 to 64 and 71 to 74) of the PVC compositions was measured in cyclohexanone (0.5 g of polymer dissolved in 100 ml) at 25° C. (DIN 53 726).

Preparation of the PVC Suspensions

Example 1

(Analogous to DE-A 36 33 818)

A polymerization reactor was filled with 15,000 kg of water, 4.2 kg of methylhydroxypropylcellulose (methoxy content 29% by weight, propoxy content 10% by weight; viscosity of the 2% strength by weight aqueous solution 20° C./50 mPas), 15 kg of sodium tripolyphosphate, 6 kg of dilauroyl peroxide and 4.5 kg of tert-butyl peroxyneodecanoate. After the atmospheric oxygen had been expelled by nitrogen and 15,000 kg of vinyl chloride had been added, the reactor was heated to 60° C. over the course of 30 minutes. After 4 hours, the polymerization was terminated by addition of 500 ppm by weight, based on the amount of monomer employed, of alpha-methylstyrene. The conversion, based on vinyl chloride, was 85%.

Example 2

Analogous to DE-A 36 33 818)

A polymerization reactor was filled with 17,000 kg of water, 4.2 kg of methylhydroxypropylcellulose (as in Example 1), 7 kg of a partially hydrolyzed polyvinyl acetate having a degree of hydrolysis of 70 mol %, 7 kg of sodium tripolyphosphate and 8 kg of tert-butyl perneodecanoate. After the atmospheric oxygen had been expelled by nitrogen and 14,000 kg of vinyl chloride had been added, the reactor was heated to 50° C. over the course of 30 minutes. After 5 hours the reaction was terminated by addition of 500 ppm by weight, based on the amount of monomer employed, of alpha-methylstyrene. The conversion, based on vinyl chloride, was 83%.

Example 3

(Analogous to EP-A 496 121)

The polymerization reactor was filled with 14,000 kg of water, 3400 kg of a 40% strength dispersion obtained by emulsion polymerization of n-butyl acrylate in the presence of 2% by weight of butadiene, 15 kg of methylhydroxypropylcellulose (as in Example 1), 14 kg of sodium tripolyphosphate and 5.6 kg of tert-butyl perneodecanoate. After the atmospheric oxygen had been dispelled by nitrogen and 14,000 kg of vinyl chloride had been added, the polymerization reactor was heated to 60° C. over the course of 30 minutes. After 4 hours, the polymerization was terminated by addition of 500 ppm by weight, based on the amount of vinyl chloride, of alpha-methylstyrene. The conversion, based on vinyl chloride, was about 80%.

In the examples below, the connector (5) used in the novel apparatus was a cylindrical steel part with a length (=height) of 4 m and a diameter of 0.6 m. The connection line to the vacuum unit was connected at a height of 3.5 m.

Example 4

(a) Pre-Degassing 30,000 l of a PVC dispersion from Example 1 were decompressed from a pressure of 990 kPa and a temperature of 64° C. to atmospheric pressure (100 kPa) with a simultaneous increase in the internal temperature (=temperature of the dispersion) to 95° C. by addition of steam (steam pressure=16 bar) in a polymerization reactor with a capacity of 45 m$^3$. After 45 minutes, the pressure had dropped to 100 kPa. The VC content of the resultant dispersion was 1000 ppm.

(B) Intensive Degassing

In the case of the pre-degassed dispersion from step (a), the pressure in the polymerization reactor was reduced further to a final pressure of 80 kPa at a final temperature of 95° C. At the same time, 0.09 t/h of steam per tonne of PVC were passed through the dispersion, and 0.02 t/h of steam per tonne of PVC were removed via the vacuum device. The inert-gas (nitrogen) feed was 2 m$^3$ per tonne of PVC (dried). The cooling surface area of the cooling device was 80 m$^2$. After 45 minutes, the mixture had cooled to room temperature and the pressure was 100 kPa. The residual VC content of the dispersion was 0.5 ppm.

Examples 5 and 6

In Example 5, a PVC suspension from Example 2 and in Example 6, a PVC suspension from Example 3 were subjected, analogously to Example 4, to intensive degassing with the parameters shown in the table below. The conditions for pre-degassing were the same as given under (a) in Example 4, with the exception of the temperatures for the respective pre-degassing steps, which corresponded to those for the intensive degassing (see Table). The table also shows the residual VC contents obtained in the still undried dispersions. Residual VC contents of the dried products were in all cases<0.1 ppm.

The bulk density was determined in accordance with DIN 53 466. The porosity was determined in accordance with DIN 53 417.

TABLE

| | | | | | Amount of steam | | | | | |
| --- | --- | --- | --- | --- | --- | --- | --- | --- | --- | --- |
| | | | | | Intensive degassing conditions | | | | | |
| Example | Product K value | Temp. [°C.] | Pressure [bar] | Duration [min] | added t of steam/h/t of PVC | removed | Residual VC [ppm] | Porosity [%] | Bulk density [g/cm$^3$] | $d_{50}$ [μm] |
| 4 | 60 | 95 | 0.8 | 45 | 0.09 | >0.02 | 0.5 | 14 | 0.58 | 155 |
| 5 | 71 | 85 | 0.6 | 30 | 0.10 | >0.02 | 2 | 30 | 0.47 | 140 |
| 6 | 64 | 90 | 0.7 | 60 | 0.17 | >0.02 | 0.2 | 9 | 0.57 | 150 |

What is claimed is:

1. An apparatus for steam stripping vinyl chloride from suspensions and dispersions of polyvinyl chloride which comprises: a polymerization reactor (1), a cooling device (2), a vacuum unit (3), a steam inlet (4) in the lower half of the polymerization reaction (1) and a connector (5) which connects the polymerization reactor, the cooling device and the vacuum unit to one another, the vacuum unit being connected by a tube to the connector (5) at a point between the reactor (1) and the cooling device (2).

2. An apparatus as defined in claim 1, wherein the cooling device (2) contains a device (6) for introducing an inert gas at the upper end.

3. A process for degassing polyvinyl chloride-containing dispersions, in which unreacted vinyl chloride is removed by means of steam, which comprises carrying out the degassing in the apparatus defined in claim 1.

* * * * *